March 21, 1950 T. H. KRUEGER 2,501,341

TAPE SERVING AND APPLYING DEVICE

Filed Feb. 23, 1945 5 Sheets-Sheet 1

INVENTOR
THEODORE H. KRUEGER
BY
Moses, Nolte, Crews & Berry
ATTORNEYS

March 21, 1950 T. H. KRUEGER 2,501,341

TAPE SERVING AND APPLYING DEVICE

Filed Feb. 23, 1945 5 Sheets-Sheet 2

INVENTOR
THEODORE H. KRUEGER

BY Moses, Nolte, Crews & Berry
ATTORNEYS

March 21, 1950 T. H. KRUEGER 2,501,341

TAPE SERVING AND APPLYING DEVICE

Filed Feb. 23, 1945 5 Sheets-Sheet 3

INVENTOR

THEODORE H. KRUEGER

BY

Moses, Nolte, Crews & Berry

ATTORNEYS

TAPE SERVING AND APPLYING DEVICE

Filed Feb. 23, 1945 5 Sheets-Sheet 4

INVENTOR
THEODORE H. KRUEGER
BY
Moses, Nolte, Crews & Berry
ATTORNEYS

March 21, 1950 T. H. KRUEGER 2,501,341

TAPE SERVING AND APPLYING DEVICE

Filed Feb. 23, 1945 5 Sheets-Sheet 5

INVENTOR
THEODORE H. KRUEGER
BY
Moses, Nolte, Crews + Berry
ATTORNEYS

Patented Mar. 21, 1950 2,501,341

UNITED STATES PATENT OFFICE 2,501,341

TAPE SERVING AND APPLYING DEVICE

Theodore H. Krueger, Stratford, Conn., assignor to Better Packages Incorporated, a corporation of New York Application February 23, 1945, Serial No. 579,437

18 Claims. (Cl. 216—33)

This invention relates to devices for serving and applying adhesive tape to tubes, bars, bottles, small cans, electrical conductor units, and other small objects which can be held in the hands and readily manipulated. It is frequently desirable to apply identification labels, sealing strips, insulating strips, or other adhesive strips to such articles, and it is an object of the present invention to provide a convenient device for holding a supply of tape permitting the same to be served or withdrawn therefrom and facilitating the application of the adhesive tape or label to the article.

The invention is particularly applicable to the serving and applying of strips or labels coated with a pressure sensitive adhesive. Features of the invention may be used, however, in connection with other types of adhesive strips such as strips coated with heat sensitive adhesive, water softened adhesive, or adhesive applied fresh to the strip as served, provided suitable means are used for conditioning or applying the adhesive before application.

Among the more specific objects of the invention are the provision of means for supporting the end of the tape strip as withdrawn from the roll or source of supply in a position where it may be engaged and caused to adhere to the article to which the strip is to be applied, which is then manipulated in such a way as to wind the strip partly or wholly around the article, the strip being thereby attached to the article with sufficient firmness to permit the strip to be pulled from the roll by movement of the article.

Another object of the invention is to provide a tape feed gauge or stop against which the article with the tape attached thereto may be moved so as to properly limit or measure the amount of tape to that required for application to the particular article being taped.

Another object of the invention is to provide means for cutting off the tape after the proper amount has been withdrawn.

Another object of the invention is to provide means by which the end of the tape attached to the article after it has been cut off from the main strip or tape may be pressed down and smoothed into firm engagement with the article, so as to leave no loose ends projecting therefrom.

Other objects and advantages will appear in the course of the following description of certain preferred forms of the invention chosen to illustrate the principles thereof.

In the accompanying drawings.

Figure 1:
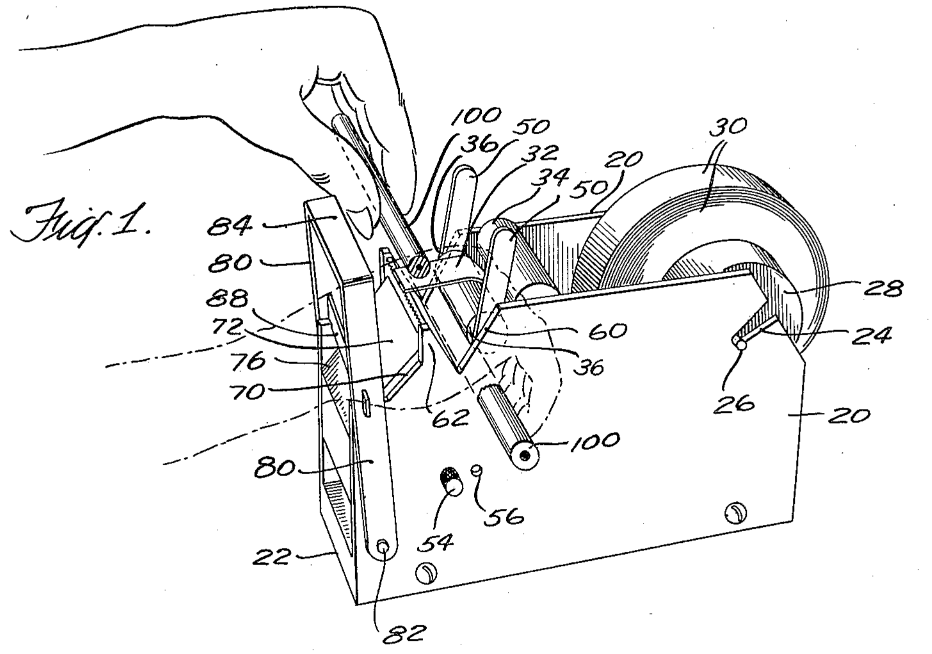
Figure 1 is a perspective view of one form of the invention showing an elongated article held in the hand of the operator and in the position which it will occupy at the start of the tape affixing operation.
Figure 2:
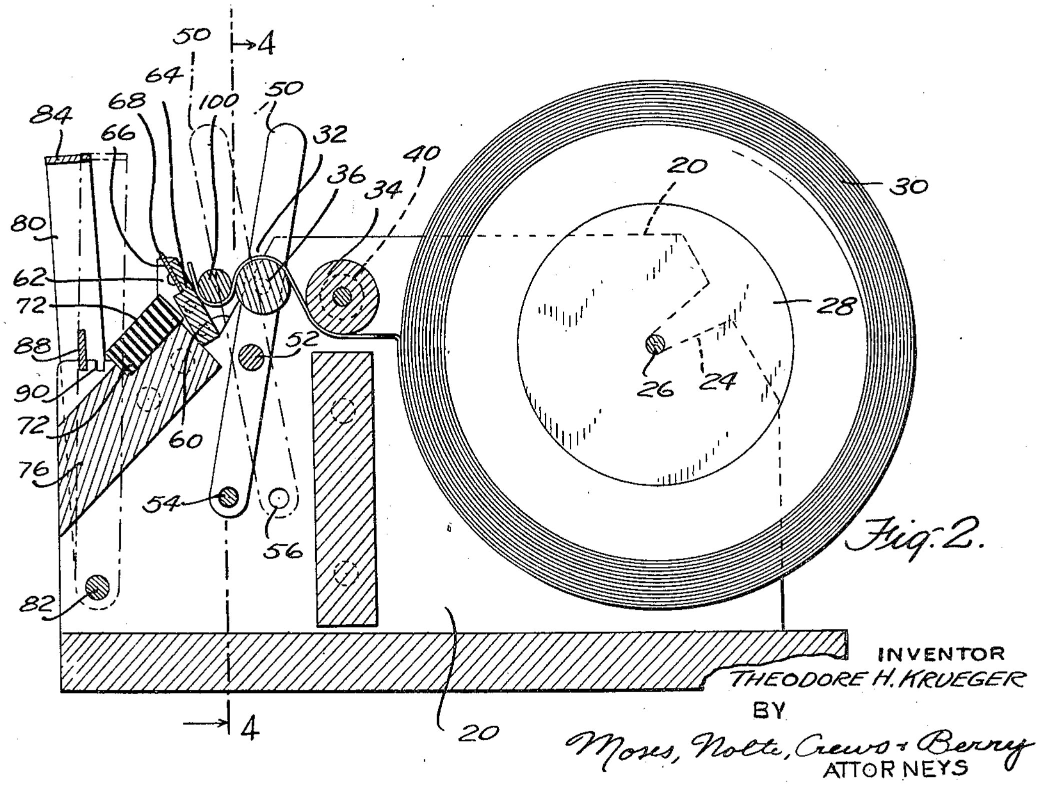
Figure 2 is a longitudinal vertical section of the apparatus shown in Figure 1 with the tape partly applied to the article.
Figure 3:
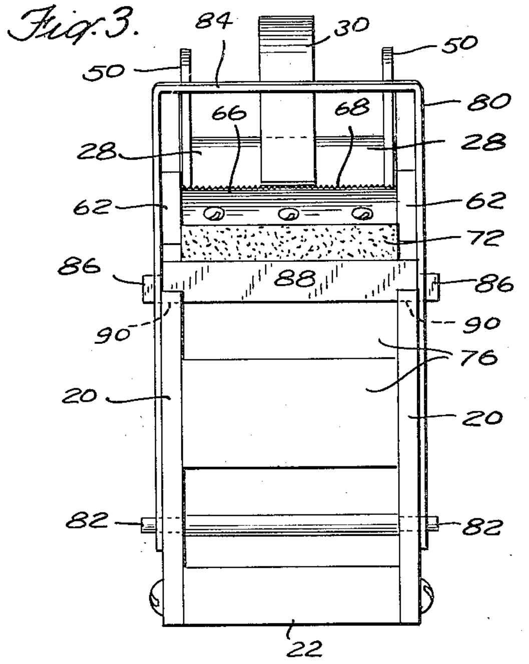
Figure 3 is an end view of the device shown in Figs. 1 and 2.
Figure 4:
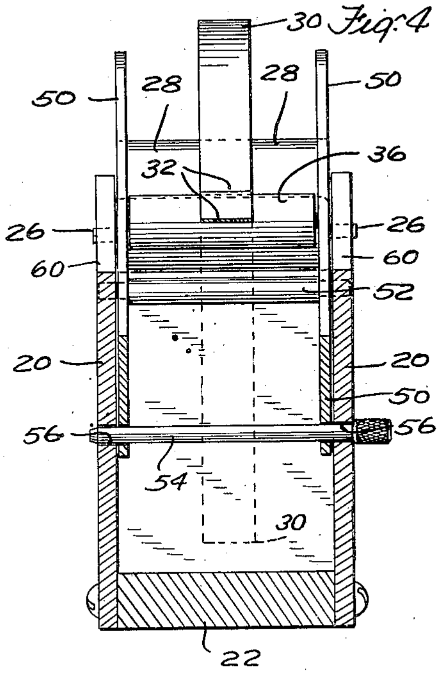
Figure 4 is a transverse vertical section taken on the line 4—4 of Figure 2.
Figure 5:
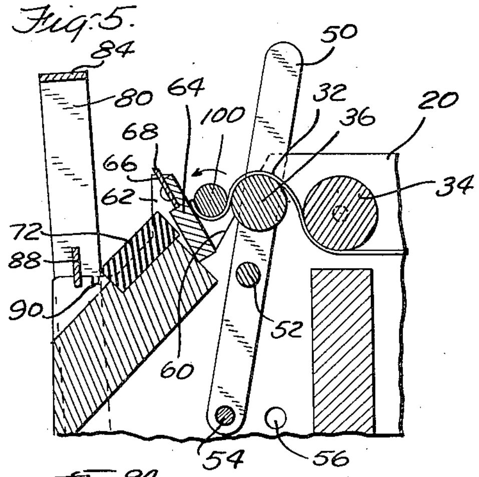
Figure 5 is a fragmentary longitudinal sectional view showing the tape applying parts and illustrating the application of the leading end of the tape to the article.

Referring to the drawings in detail, and particularly to the form of the invention shown in Figs. 1 to 8 inclusive, the machine is provided with a suitable frame shown as comprising sides 20 and a bottom or base 22. The sides 20 are provided with notches 24 for receiving the spindle 26 of a supporting core 28 on which is mounted a roll 30 of pressure sensitive adhesive tape. The end of the strip is shown at 32, this having been drawn from the roll 30 under a guide roller 34 and over a second guide roller 36. The guide roller 34 is preferably provided with a friction brake or retarding device such as the friction spring 40 which bears against the end of the roller and side of the frame and prevents the roller from turning freely. It will be noted that the adhesive side of the tape is faced upwardly in the position shown at 32 and that the adhesive side thus passes under and in contact with the roller 34 whereas the non-adhesive side of the tape is in contact with the roller 36. As the tape will stick to the roller 34 and as the latter is held from free rotation by the friction means described, the roller 34 will hold the tape in position and prevent the tape from escaping from control or from being drawn back by the momentum of the supporting core 28 and roll of tape 30 after the tape has been pulled out and the end attached to the article has been severed. The roll 36 is carried by a pair of arms 50 which are preferably adjustable so that they may be set at the most desirable angle depending upon the size of the article being handled. As illustrated they are pivoted on a cross-pin 52 and their lower ends are perforated and are engaged by a removable cross-pin 54 which may be inserted in one or another of a plurality of holes in the side plates 20, one of which is shown in Figure 1 at 56. The bars 50 preferably project upwardly above the roller 36 so as to provide guide means for facilitating the proper location of the article to be taped.

The side walls 20 are provided with a pair of notches or cut-out portions 60, the projecting portions of the side walls in front of these cut-out portions being designated 62 and carrying a plate 64 which also carries a knife 66, the cutting edge 68 of which is preferably serrated. The guide or affixing roller 36 is desirably made out of somewhat yielding material, such for instance as felt or rubber. This, however, is not essential. Beyond the projections 62 of the side walls the walls are cut away as indicated at 70 and mounted between the side walls at this location is a wiping or pressure pad 72 which is preferably formed of somewhat yielding material such for instance as felt. This felt pad is supported in any suitable manner, as by means of a backing plate 74 carried on bars 76 attached to the side walls.

Mounted adjacent to the front of the machine are feed gauge bars 80 which constitute a stop for limiting the movement of the article with the tape strip attached thereto. The bars 80 in the form shown are pivoted at their lower ends on a cross bar 82 and are shown as connected at the top by cross-piece 84. The bars 80 may be adjusted about the pivot 82 and held in adjusted position by a cross bar 86 mounted to have limited up and down movement in slots 88 in the bars 80 and to be engaged in one or another of notches 90 formed in the side walls. This permits the bars 80 to be adjusted to the position most convenient for the size of article being handled and enables the proper length of tape to be measured for applicability to an article of such size.

Figure 7:
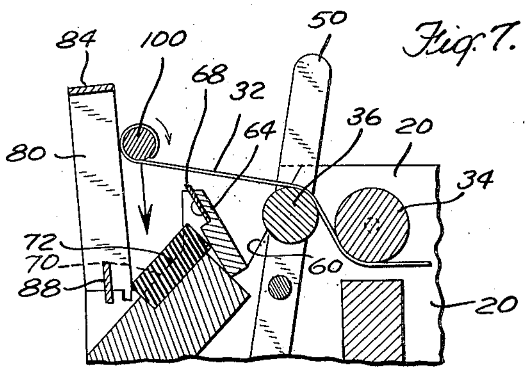
Figure 7 is a view similar to Figs. 5 and 6 showing the article with the tape applied thereto moved back against the feed gauge bars so as to measure the length of the tape drawn from the roll.
Figure 6:
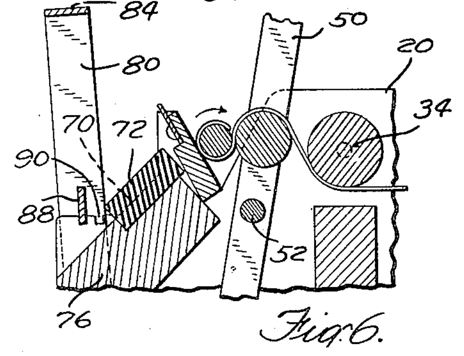
Figure 6 is a view similar to Fig. 5 showing the end of the tape wound about the article.
Figure 8:
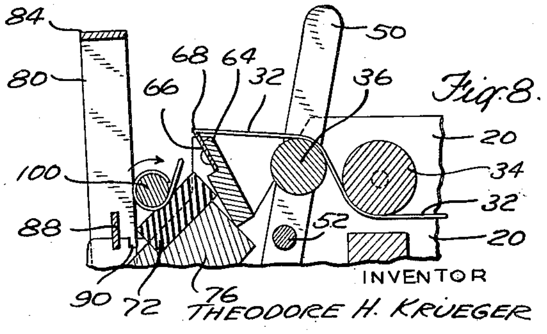
Figure 8 is a view similar to Figs. 5, 6 and 7 showing the position in which the tape has been severed and is being smoothed down upon the article.
Figures 9, 10:
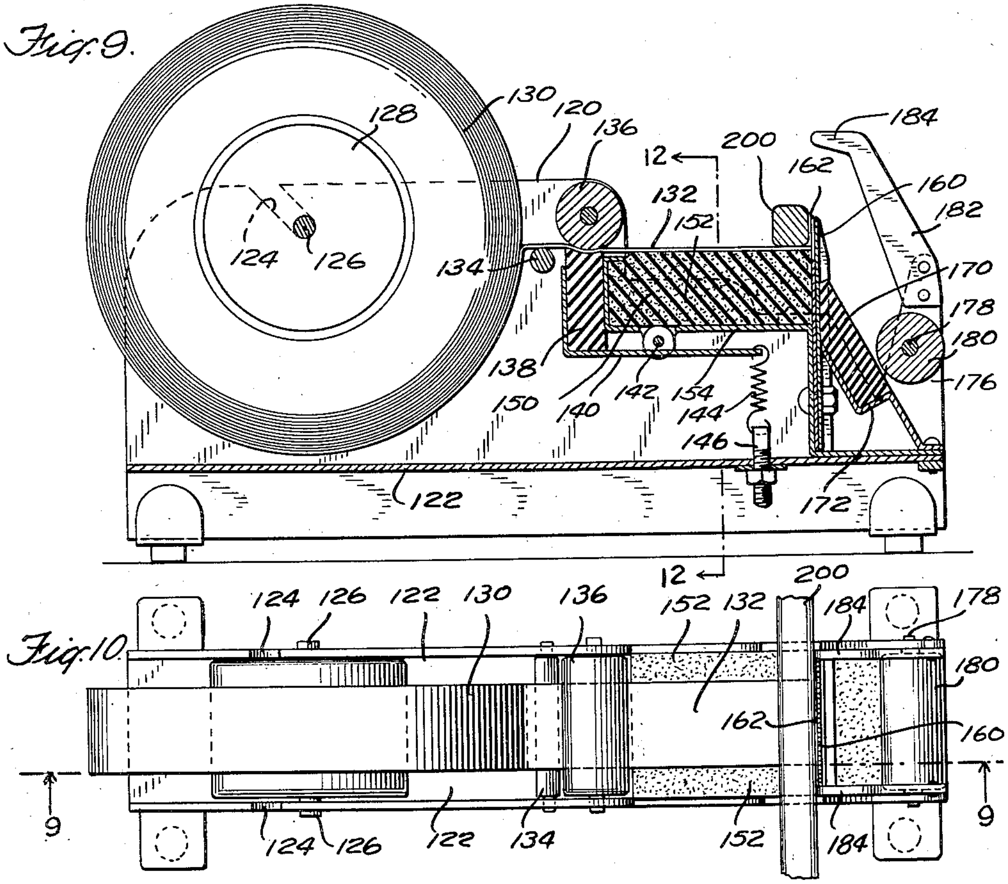
Figure 9 is a longitudinal vertical section on line 9—9 of Fig. 10 of another form of apparatus embodying the invention.
Figure 10 is a top view of the device shown in Fig. 9.

Figure 1 shows the position of the end of the tape at the start of operation, this being the position in which the tape will be left after the completion of application of a piece of tape to the previously wrapped article. The severed end of the tape will ordinarily remain supported by the serrated edge of the cutting knife and resting upon the affixing roller 36. The operator picks up an article 100 to be taped, grasping it in both hands if it is an article of sufficient length to project from each side of the machine. He then depresses the article upon the tacky upper surface of the tape. This causes the tape to adhere to the article and the article is then pressed into the affixing trough carrying the tape with it into contact with the roller 36 and plate 64. The position of the roller 36 has previously been adjusted by adjustment of the bars 50, so that the article will be received properly between the plate and the roller without passing all the way between the same and while permitting the article to be rotated in this space. If the article is of irregular or non-circular shape then it is not pressed down too far but is held more or less against the roller 36. The article is then manipulated, twirled or rotated by the operator in such a way as to first force the free end of the tape in contact with the article which may be done by turning the article in a slightly counterclockwise direction (Fig. 5) and pushing the free end of the tape against the plate 64 until it is firmly adhered to the article. The article is then rotated in a clockwise direction in contact with the tape and roller 36 until the tape has been wrapped around the article to the extent desired (Fig. 6). The tape may be wrapped around the article one or more complete turns or only part of a turn depending upon the purposes for which the tape is to be applied. The tape is now firmly affixed to the article and the article is now lifted out of the space between the plate 64 and the roller 36 and drawn forwardly until its movement is stopped by engagement with the tape feed gauge bars 80, as shown in Fig. 7. This limits the amount of tape which can be withdrawn at one time, thereby preventing waste of tape and withdrawing just the right amount for completing the wrapping operation. The article is then moved downwardly beyond the cutting knife, preferably being guided in this movement by the bars 80. During this movement the tape is brought against the serrated edge of the knife and cut off. Preferably the article is tipped or slanted so that the severing is done progressively from one side of the tape to the other, as this makes the operation easier. The article with the tape attached is then brought into contact with the pressure pad 72, as shown in Fig. 8, and by further rotation of the article in a clockwise direction the cut off end of the tape is rubbed down upon the article so as to adhere firmly thereto and leave no free projecting end. The cutting off of the tape in this manner also leaves the tape resting upon the serrated edge of the knife, as shown in Figs. 8 and 1, ready for receiving the next article.

As will be seen from the above, it is possible to apply the tape to the article with very simple manipulations, then move the article with the tape attached in such a way as to withdraw the proper length of tape, then move the article so as to cut off the tape and rub down the free end. All of this may be done with a minimum of effort on the part of the operator and with the assurance that the tape will be properly applied and that no more tape will be used than is desirable for the operation, thereby avoiding any waste.

Figures 9 to 15 inclusive show another form of the machine, similar in general principles to that already described but differing in a number of detailed features. In this form of the invention the machine comprises side walls 120 connected to a base 122. The side walls are notched at 124 to hold a spindle 126 carrying a core 128 on which is mounted a roll 130 of pressure sensitive adhesive tape. The end of the tape is shown at 132 with the adhesive surface up. The end of the tape is withdrawn from the roll 130 and passes over a guide roller 134 and under a tension roller 136 against which it is preferably yieldingly pressed by a presser. As illustrated, the presser comprises a felt block 138 mounted on the lever 140 pivoted at 142, the opposite end of the lever from that carrying the block being held down by a tension spring 144 connected to an adjustable screw 146 by which the tension of the spring may be adjusted. The roller 136 and presser 138 keep the end of the tape in position while permitting it to be drawn from the roll 130. This serves to prevent the end of the tape from being displaced by overrunning due to the momentum of the roll 130 and core if the tape is rapidly withdrawn therefrom.

Figure 11:
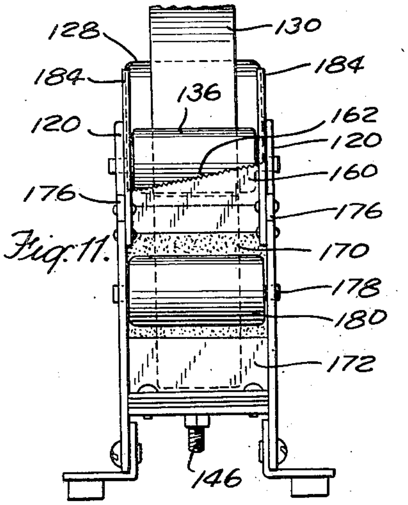
Figure 11 is a front end view of the device shown in Fig. 9.
Figure 12:
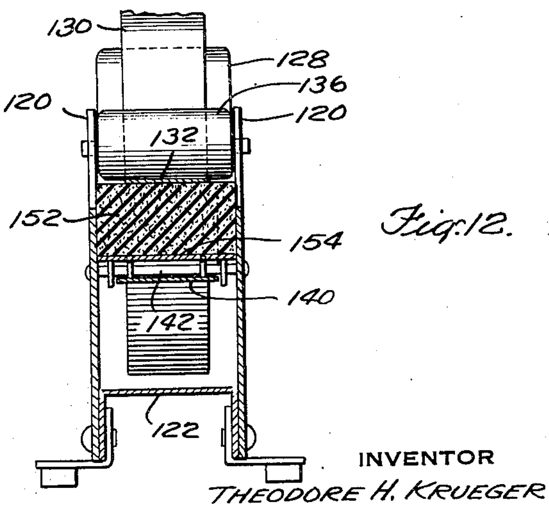
Figure 12 is a transverse vertical section on line 12—12 of Figure 10.

Mounted in front of the roller 136 and in the form shown in a substantially horizontal position, is an affixing table 150. This is preferably but not necessarily made of or surfaced with yielding material, such for instance as felt or sponge rubber. In the illustration the table comprises a sponge rubber block 152 mounted in a receptacle 154 located between the side walls of the frame. At the front end of the affixing table is located the cutter 160 which is provided with a serrated edge 162. Preferably the cutter is inclined from one side to the other as indicated in Fig. 11, as this permits the tape to be pulled down across the cutter which cuts progressively from one side of the tape to the other owing to its inclination. Owing to the presence of the serrations the tape will not slide laterally down the inclined blade. In front of the cutter is a pressure pad 170 which may be of felt, sponge rubber, or the like, preferably felt, and which is mounted in a receptacle 172. The pressure pad 170 is preferably forwardly and downwardly inclined. The side walls of the frame are notched opposite to the pressure pad, the portions of the frame in front of the notches constituting arms 176. Between these arms on a shaft 178 is pivoted an end tab affixing roller 180. Mounted on the arms 176 and projecting upwardly and forwardly therefrom are a pair of tape feed gauge bars 182, the upper ends of which are preferably forwardly hooked, as indicated at 184.

Figure 13:
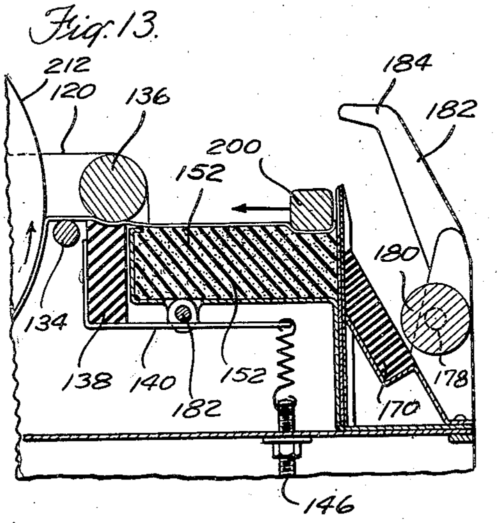
Figure 13 is a fragmentary view in longitudinal vertical section showing the first step in applying the tape to the article.
Figure 14:
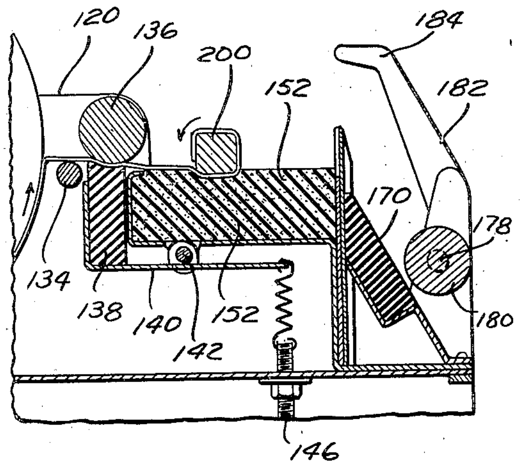
Figure 14 is a view similar to Fig. 13 showing the step of rolling the artcle upon the tape so as to apply the tape to the article.
Figure 15:
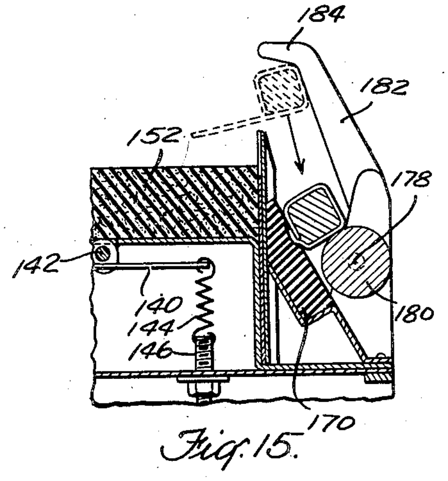
Figure 15 is a view similar to Figs. 13 and 14 showing the article after it has had the tape applied thereto and the tape has been severed, and showing the operation of smoothing down the severed end of the tape upon the article.

In the operation of the device shown in Figs. 9 to 15 the end of the tape 132 will be left lying on the surface of the affixing table 150 after the operation of applying the tape to an article has been completed and the tape severed. The article 200 to be taped is now applied to the top adhesive surface of the end of the tape, as shown in Fig. 13. Owing to the yielding character of the table the article can be pressed partly down into the same, as shown in Fig. 13, which will firmly affix the same to the end of the tape. The article is then rolled over towards the left, as shown in Fig. 14, thereby wrapping the tape around the article to the desired extent. The article is then lifted up and drawn to the right, as indicated in dotted lines in Fig. 14, until it engages the tape feed gauge bars 182, the hooked ends of the latter assisting in properly locating the article. By pulling the article against the gauge bars the proper amount of tape is withdrawn and waste of tape owing to excessive pulling of the article away from the machine is prevented. The article with the tape affixed thereto is then slid down in contact with the gauge bars, as indicated in Fig. 15, this downward movement first drawing the tape across the serrated edge of the cutter which severs the tape, the article with the tape applied thereto being then pressed into contact with the end tape pressing pad 170 and the end tape affixing roller 180. A slight rotation of the article (Fig. 15) serves to press the severed end of the tape down upon the article so as to leave no projecting edge or tab.

Figure 16:
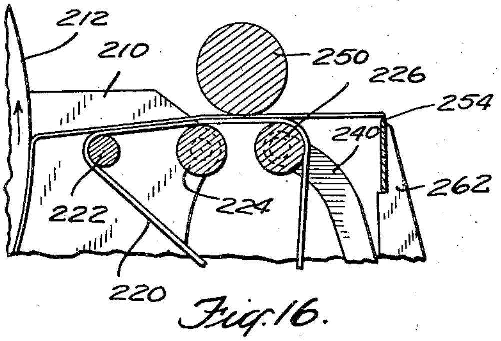
Figure 16 is a fragmentary longitudinal sectional view showing another form of tape applying device.
Figure 17:
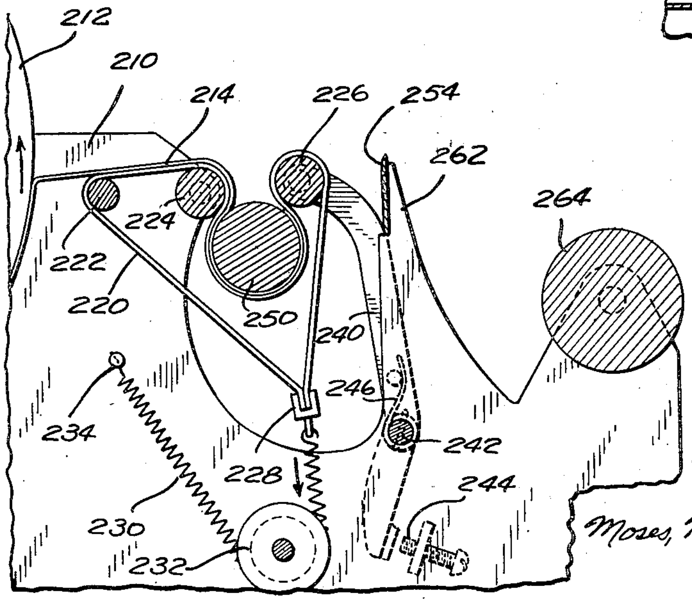
Figure 17 is a view similar to Fig. 16 showing the first step of adhering the article to the tape.

Figures 16 and 17 show a modified construction for applying the end of the adhesive tape to an article. As shown, particularly in Fig. 16, the machine has side walls 210 between which is carried a roll of tape 212 the end of the tape with the adhesive side up being shown at 214. The tape is supported on an elastic band 220 which is carried by rollers 222, 224 and 226. In the construction shown, the ends of the band 220 are held in a clamping bar 228 to which is attached a tension spring 230 passing around the guide shaft 232 and attached to a fixed anchor 234. The roller 226 is mounted between a pair of pivoted arms 240 pivoted at 242, the lower ends of the arms engaging adjustable stops 244 to limit the swinging movement of the arms in a counter-clockwise direction. The arms are urged in such direction of movement by a spring 246. At the start of operation the tape and the elastic band 220 will be stretched substantially taut across the three rolls 222, 224 and 226, as shown in Fig. 17, and the end of the adhesive tape will be supported thereon adhesive side up. An article 250 is now applied to the tape and is forced downwardly between the rollers 224 and 226. Ordinarily the roller 226 will be adjusted so that the space between the rollers 224 and 226 is somewhat less than the diameter of the article, so that when the article is forced down it will move the roller 226 to the right to permit it to pass, after which the spring 246 will swing the roller 226 back partly over the article, as indicated in Fig. 17. The movement of the article between the rollers carries with it a bight of the elastic band and the end of the adhesive tape which is thereby forced into contact with the article. By rotation of the article in a counter-clockwise direction any desired amount of the tape may be withdrawn from the roll 212 and wound about the article. When a sufficient amount of tape has been wound upon the article the article is lifted up and drawn forward and is moved down so as to draw the tape against the edge of the knife 254 to thereby sever the tape. If desired, the device may be provided with an end tape pressing pad 262 and end tape affixing roller 264. The article may be then manipulated in contact with these members so as to press down any free end tab of tape.

The elastic belt construction described provides a very firm means for folding the adhesive tape around a considerable part of the circumference of the article so as to affix the tape very firmly to the article and wipe or press it quickly around the same as the article is rotated.

Figure 18:
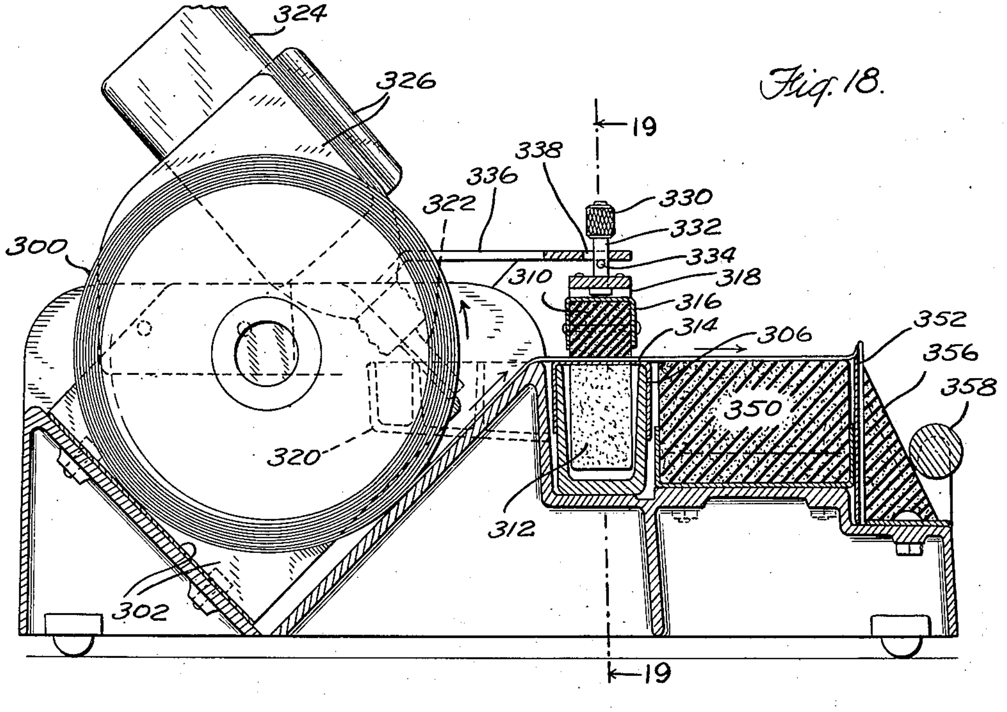
Figure 18 is a longitudinal vertical section of a form of the invention constructed to dispense and apply tape which is moistened at the time of dispensing to render it adhesive.
Figure 19:
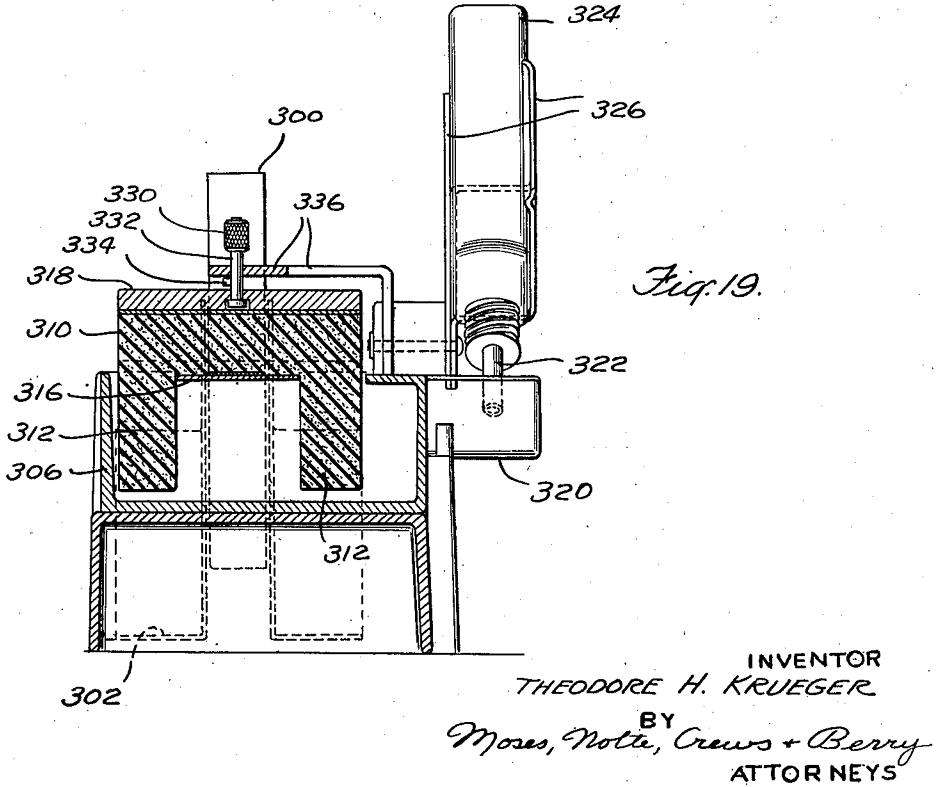
Figure 19 is a transverse vertical section on the line 18—18 of Fig. 19.

In Figures 18 and 19 a form of the invention is shown which is designed to dispense and apply gummed tape which is moistened at the time of serving to render it adhesive. Referring to these figures, the roll of tape 300 is supported in a tape basket 302 and is led out of the machine through a moistening means. In the construction shown the moistening means comprises a water tank 306 across the center of which in the path of travel of the tape is mounted a tape table 308. In the tank is a moistening element which in the construction shown comprises a sponge 310 of fine-grained cellulose or other suitable material having capillary properties. This sponge is cut into inverted U-shape so as to have two legs 312 which dip down into the water on each side of the table 308 and draw the water up into the head of the sponge which rests on the gummed upper surface of the tape. The bottom surface of the central part of the sponge between the legs forms a moisture applying surface 314, the tape passing between this surface and the top of the table. The head of the sponge is preferably received in a metal channel 316 which carries a weight 318. The weight presses the sponge down on the gummed surface of the tape with sufficient force to properly apply the moisture thereto. Moisture is supplied to the tank 306 from an auxiliary cup 320 which projects from one side of the machine and receives the nozzle 322 of an inclined water bottle or fountain 324 supported in a bracket 326 on the side of the machine. The fountain serves to keep the water level in the tank constant in a well understood manner. In ordinary use the machine will be employed more or less constantly and at such times the sponge merely rests upon the gummed surface of the tape which is drawn along at sufficiently frequent intervals to prevent the sponge from sticking thereto. It is desirable, however, to provide means for supporting the sponge out of contact with the surface of the tape at times when the machine is not in active use. For this purpose a thumb nut 330 is provided mounted on a rotatable stem 332 attached to the weight 318. The stem carries a pin 334. Mounted on the machine is a supporting plate 336 having a keyhole-shaped slot 338 therein through which passes the stem 332. When the pin 334 is in line with the keyhole extension of the slot the thumb nut 330 may be lifted, drawing with it the sponge. The thumb nut is then turned so that the pin 334 will engage upon the top of the plate 336 and hold the sponge suspended out of contact with the surface of the tape.

Mounted in front of the moistener are suitable devices for applying, cutting off, and sealing down the end of the tape. These devices may be similar to those already described for use with pressure sensitive adhesive tape. In the construction shown a sponge rubber table 350 constitutes an affixing table similar to the affixing table 150 shown in Figs. 9 to 15. In front of the affixing table is a knife, preferably in the form of an inclined blade with a serrated edge, the blade being indicated at 352. In front of the blade is a pressure pad 356 and an affixing roller 358, these parts being similar to and operating in like manner with the pad 170 and roller 180 shown in Fig. 9.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

What is claimed is:

1. In a machine for applying adhesive tape, a support for a supply of tape, means providing a tape applying surface against which an article with the end of the strip of tape coming from the tape supply may be rolled so as to wind the tape about the article, a tape cutter located adjacent to the tape applying surface in position to cut the strip of tape between the wrapped article and the tape supply, and a measuring stop located beyond the cutter in the direction of travel of the tape from the tape supply for limiting the movement of the article with the tape attached thereto prior to cutting the tape.

2. In a machine for applying adhesive tape, a support for a supply of tape, means providing a tape applying surface against which an article with the end of the strip of tape coming from the tape supply may be rolled so as to wind the tape about the article, means for severing the tape between the wrapped article and the tape supply, an end tab pressing means for pressing the cut end of the tape upon said article, said end tab pressing means including a pad, an article supporting surface, and an end tab presser roller.

3. In a machine of the character described, a support for a supply of tape, means against which an article with the end of a strip of tape applied may be rolled so as to wind the tape about the article, a cutting knife located adjacent to said means, a measuring stop for limiting the movement of the article with the tape applied thereto to a position in which the tape is drawn past said knife, and an end tab presser located beyond the said knife for pressing the cut end of the tape upon said article.

4. In a machine of the character described, means for supporting a supply of adhesive tape, a tape applying roller, a tape applying plate spaced from said roller and forming with the said roller a trough adapted to receive an article to which tape is to be applied, a knife mounted adjacent to said plate, and an end tab presser located at the opposite side of said knife from said tape applying roller.

5. In a machine of the character described, means for supporting a supply of adhesive tape, a tape applying roller, a tape applying plate spaced from said roller and forming with said roller a trough adapted to receive an article to which tape is to be applied, a knife mounted adjacent to said plate, an end tab presser located at the opposite side of said knife from said tape applying roller, and a tape feed gauge located beyond said end tab presser in the direction of travel of the tape away from the supply of tape.

6. In a machine of the character described, a frame, means thereon for supporting a roll of adhesive tape, an adhesion roller adjacent to said roll of tape arranged to engage the adhesive side of the tape, a tape affixing roller in front of said adhesion roller, an article supporting plate in front of said tape affixing roller and spaced therefrom so as to form therewith an article receiving trough, a tape cutter located in front of said trough, and a tape feed gauge spaced in front of said trough and adapted to be engaged by the article with the tape applied thereto to limit the forward movement of the article.

7. In a machine of the character described, means for supporting a roll of adhesive tape, a tape affixing table mounted in front of said tape supporting means, a cutter mounted in front of said tape affixing table, and a tape feed gauge mounted in front of said cutter and spaced therefrom.

8. In a machine of the character described, means for supporting a roll of adhesive tape, a tape affixing table mounted in front of said tape supporting means, and a cutter mounted in front of said tape affixing table, said tape affixing table having a yielding surface adapted to contact the non-adhesive side of the tape and over which an article may be rolled to apply the tape to the article.

9. In a machine of the character described, means for supporting a roll of adhesive tape, a tape affixing table mounted in front of the roll of tape, and a cutter mounted in front of said tape affixing table, said tape affixing table comprising a block of sponge rubber supporting the tape adhesive side up and upon which the article can be rolled.

10. In a machine of the character described, means for supporting a roll of adhesive tape, tape tensioning means engaging the strip of tape leading from the roll, a tape affixing table mounted in front of said tape tensioning means, a cutter mounted in front of said tape affixing table, and a tape feed gauge mounted in front of said cutter and spaced therefrom, said cutter comprising a transversely inclined blade having a serrated cutting edge.

11. In a machine of the character described, means for supporting a roll of adhesive tape, a tape affixing table mounted in front of the roll of tape, a cutter mounted in front of said tape affixing table, a tape feed gauge mounted in front of said cutter and spaced therefrom, and end tab pressing means mounted between said cutter and said tape feed gauge.

12. In a machine of the character described, means for supporting a roll of adhesive tape, a tape affixing table mounted in front of the roll of tape, a cutter mounted in front of said tape affixing table, and end tab pressing means mounted in front of said cutter.

13. In a machine of the character described, means for supporting a roll of adhesive tape, a tape affixing table mounted in front of the roll of tape, a cutter mounted in front of said tape affixing table, and end tab pressing means mounted in front of said cutter, said end tab pressing means including a pressing pad of yielding material.

14. In a machine of the character described, means for supporting a roll of adhesive tape, a tape affixing table, a cutter mounted in front of said tape affixing table, and a tape feed gauge mounted in front of said cutter and spaced therefrom, said tape feed gauge comprising upwardly extending spaced gauge bars.

15. In a machine of the character described, means for supporting a roll of adhesive tape, tape tensioning means engaging the strip of tape leading from the roll, a tape affixing table mounted in front of said tape tensioning means, a cutter mounted in front of said tape affixing table, and a tape feed gauge mounted in front of said cutter and spaced therefrom, said tensioning means including a roller engaging the tacky side of the tape and a tensioning block pressed yieldingly against the non-tacky side of the tape opposite said roller.

16. In a machine of the character described, means for supporting a roll of adhesive tape, and for applying said tape to an article including a pair of spaced guide rollers and an elastic band mounted upon said rollers and spanning the space between them and adapted to form a bight for receiving the article to which tape is to be applied, a cutter mounted in front of said rollers and an end tab presser mounted in front of said cutter.

17. In a machine of the character described, means for supporting a roll of adhesive tape, and means for applying said tape to an article including a pair of spaced guide rollers and a flexible band mounted upon said rollers and spanning the space between them, adapted to form a bight for receiving the article to which tape is to be applied, clamping means for holding the ends of said flexible band, a tension spring connected to said clamping means for applying elastic tension to said band, and a spring pressed support for one of said rollers permitting it to move towards and from the other roller when the article to which the tape is to be applied is pressed into the bight of the flexible band.

18. In a machine of the character described. means for supporting a roll of pressure sensitive adhesive tape, an adhesion and guide roller contacting the tacky side of the tape for guiding and holding tape coming from the tape supply, means for retarding the movement of the tape past said adhesion and guide roller, a resilient tape supporting table for supporting the end of the tape after it leaves said adhesion and guide roller, and a tape cutting knife having an upwardly projecting edge located adjacent to the forward end of said resilient table.

THEODORE H. KRUEGER.

REFERENCES CITED

The following references are of record in the file of this patent:

UNITED STATES PATENTS

| Number | Name | Date |
|---|---|---|
| 488,791 | Leach | Dec. 27, 1892 |
| 764,707 | Briggs | July 12, 1904 |
| 889,754 | Brown | June 2, 1908 |
| 1,103,402 | Dinsmoor | July 14, 1914 |
| 2,344,340 | Adams | Mar. 14, 1944 |
| 2,348,067 | Hoitt | May 2, 1944 |